United States Patent
Chen

(10) Patent No.: US 7,015,985 B2
(45) Date of Patent: Mar. 21, 2006

(54) LIQUID CRYSTAL DISPLAY ARRAY AND LIQUID CRYSTAL DISPLAY PANEL

(75) Inventor: Ching-Chuan Chen, Taipei (TW)

(73) Assignee: AU Optronics Corp., Hsinchu (TW)

( * ) Notice: Subject to any disclaimer, the term of this patent is extended or adjusted under 35 U.S.C. 154(b) by 32 days.

(21) Appl. No.: 10/847,150

(22) Filed: May 17, 2004

(65) Prior Publication Data

US 2005/0200766 A1   Sep. 15, 2005

(30) Foreign Application Priority Data

Mar. 11, 2004   (TW) ............................... 93106451 A

(51) Int. Cl.
*G02F 1/1343*   (2006.01)
(52) U.S. Cl. .......................... 349/39; 349/38
(58) Field of Classification Search ................ 349/38, 349/39
See application file for complete search history.

(56) References Cited

U.S. PATENT DOCUMENTS

| 5,042,916 A | * | 8/1991 | Ukai et al. ..................... 349/55 |
| 5,212,574 A | * | 5/1993 | Katayama et al. ............. 349/38 |
| 6,028,650 A | * | 2/2000 | Kuroha et al. ................. 349/38 |
| 6,115,087 A | * | 9/2000 | Ohi .............................. 349/38 |
| 6,894,734 B1 | * | 5/2005 | Ihara ........................... 349/38 |

* cited by examiner

Primary Examiner—James A. Dudek
(74) Attorney, Agent, or Firm—Thomas, Kayden, Horstemeyer & Risley

(57) ABSTRACT

A liquid crystal display array. The liquid crystal display array has a plurality of gate lines, a plurality of source lines and a plurality of cells. Each gate line comprises a first portion and a second portion extended from the first portion. Each cell corresponds to the interlaced data line and scan line and has a first storage capacitor. A first electrode of the first storage capacitor corresponding to a first gate line of the gate lines is coupled to the first portion or the second portion of any gate line except the first gate line.

19 Claims, 5 Drawing Sheets

LIQUID CRYSTAL DISPLAY ARRAY AND LIQUID CRYSTAL DISPLAY PANEL

BACKGROUND OF THE INVENTION

1. Field of the Invention

The present invention relates to a liquid crystal display array in which one electrode of a storage capacitor within each cell is coupled to a first portion or a second portion of one gate line, thus reducing gate line delay time.

2. Description of the Related Art

A conventional thin film transistor liquid crystal display (TFT-LCD) generally comprises driving circuits and an array of cells driven thereby. The driving circuits drive a plurality of gate lines formed in parallel and a plurality of source lines formed orthogonal to the gate lines. Each cell, disposed near an intersection of one of the gate lines and one of the source lines, includes a thin film transistor (TFT) and a storage capacitor. The TFT further includes a gate coupled to a corresponding gate line and a source coupled to a corresponding source line. According to the different structures of storage capacitors, TFT-LCD arrays can be divided into two types, Cs-on-gate type and Cs-on-common type. In a Cs-on-gate array, a storage capacitor is formed between a source of a corresponding TFT and a previous gate line, that is, the reference voltage of the storage capacitor is the potential of the previous gate line. In a Cs-on-common array, a storage capacitor is formed between a source of a corresponding TFT and a common electrode, that is, the reference voltage of the storage capacitor is the potential of the common electrode.

FIG. 1 is a schematic diagram of a conventional Cs-on-common array of a TFT-LCD. The array 1 is formed by a plurality of gate lines $G1_n$ to $G1_{n-2}$ and a plurality of source line $D1_m$ and $D1_{m-1}$. The interlaced gate line and source line correspond to one cell, for example, the interlaced gate line $G1_{n-1}$ and source line $D1_{m-1}$ correspond to a cell 100. The cell 100 includes a TFT 10, a liquid capacitor Clc10, and a storage capacitor Cs10. Referring to FIG. 1, a gate of the TFT 10 is coupled to the gate line $G1_{n-1}$, a source thereof is coupled to a pixel electrode 11, and a drain thereof is coupled to the source line $D1_{m-}$. The storage capacitor Cs10 is formed between the pixel electrode 11 and a common electrode Vcom10. Each storage capacitor within the cells on the same row is coupled between a pixel electrode thereof and the common electrode.

FIG. 2 is a schematic diagram of a conventional Cs-on-gate array of a TFT-LCD. The array 2 is formed by a plurality of gate lines $G2_n$ to $G2_{n-2}$ and a plurality of source lines $D2_m$ and $D2_{m-1}$. The interlaced gate line and source line correspond to one cell, for example, the interlaced gate line $G2_{n-1}$ and source line $D2_{m-1}$ correspond to a cell 200. The cell 200 includes a TFT 20, a liquid capacitor Clc20, and a storage capacitor Cs20. Referring to FIG. 2, a gate of the TFT 10 is coupled to the gate line $G2_{n-1}$, a source thereof is coupled to a pixel electrode 21, and a drain thereof is coupled to the source line $D2_{m-1}$. The storage capacitor Cs20 is formed between the pixel electrode 21 and the gate line $G2_{n-2}$. In cells on the same row, all the TFTs are coupled to the same gate line, and each storage capacitor is coupled between a pixel electrode thereof and the previous gate line.

As described above, the Cs-on-common array has an extra common electrode line, thus reducing the aperture ratio. Due to low brightness of the TFT-LCD caused by the low aperture ratio, the Cs-on-common type TFT-LCD array is less used. The Cs-on-gate type TFT-LCD array is commonly used instead. When each gate line is coupled to a plurality of storage capacitors in the Cs-on-gate array, RC effect, induced by the gate lines and the storage capacitors, causes increased in gate line delay time and degrades the capability of TFTs to charge the pixel electrodes.

SUMMARY OF THE INVENTION

Accordingly, an object of the present invention is to provide a array for a liquid crystal display panel that ameliorates disadvantages of the related art.

According to the above described object, the present invention provides a liquid crystal display array comprising a plurality of gate lines, a plurality of source lines, and a plurality of cells. Each gate line comprises a first portion and a second portion extended from the first portion. Each cell corresponds to the interlaced gate line and source line and comprises a first storage capacitor. A first electrode of the first storage capacitor corresponding to a first gate line is coupled to the first portion or the second portion of any gate line expect the first gate line.

A detailed description is given in the following embodiments with reference to the accompanying drawings.

BRIEF DESCRIPTION OF THE DRAWINGS

Various aspects of the present invention can be more fully understood by reading the subsequent detailed description and examples with references made to the accompanying drawings, wherein.

DETAILED DESCRIPTION OF THE INVENTION

Figure 1:
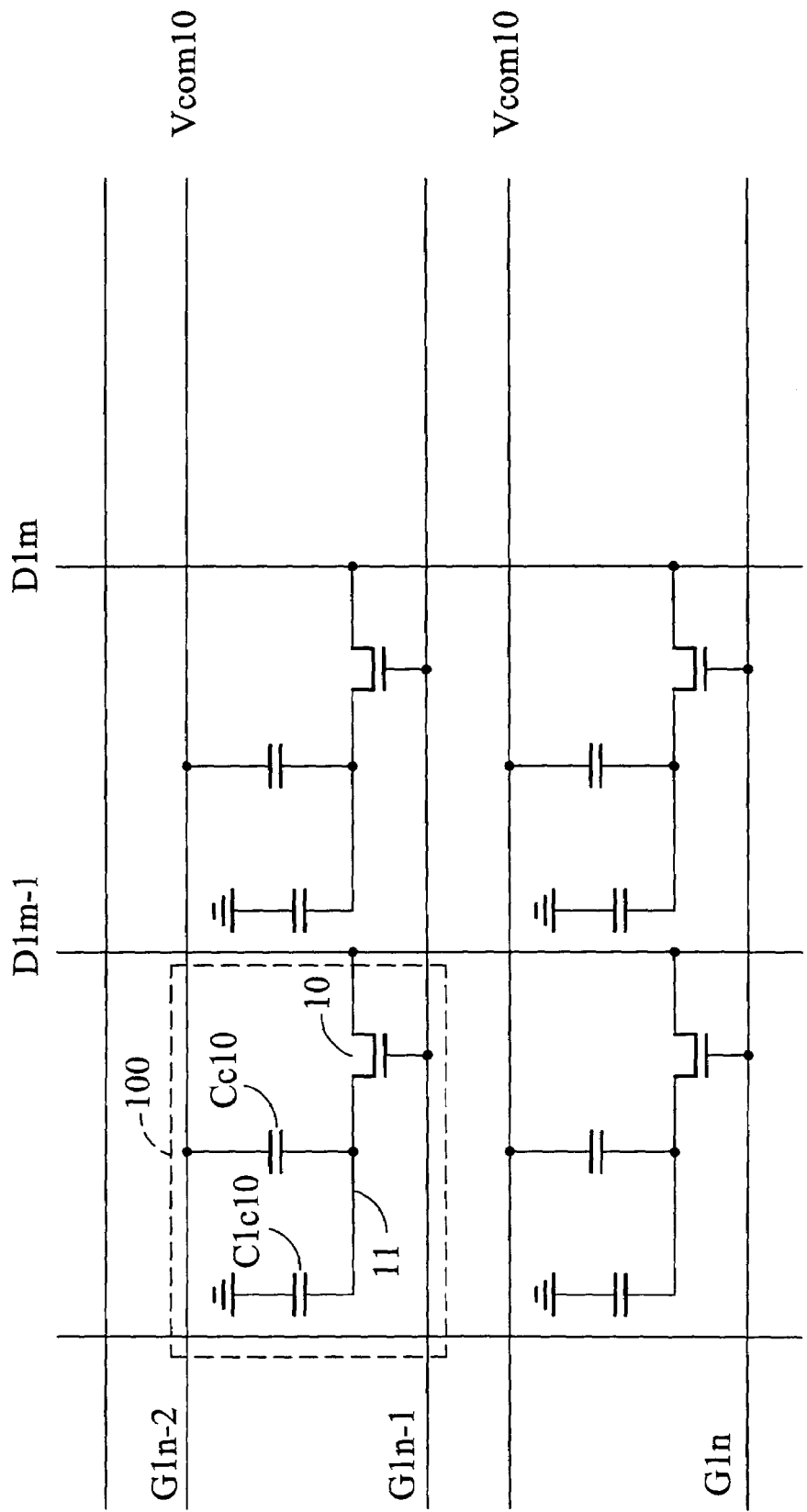
FIG. 1 is schematic diagram of a conventional Cs-on-common array of a TFT-LCD.
Figure 2:
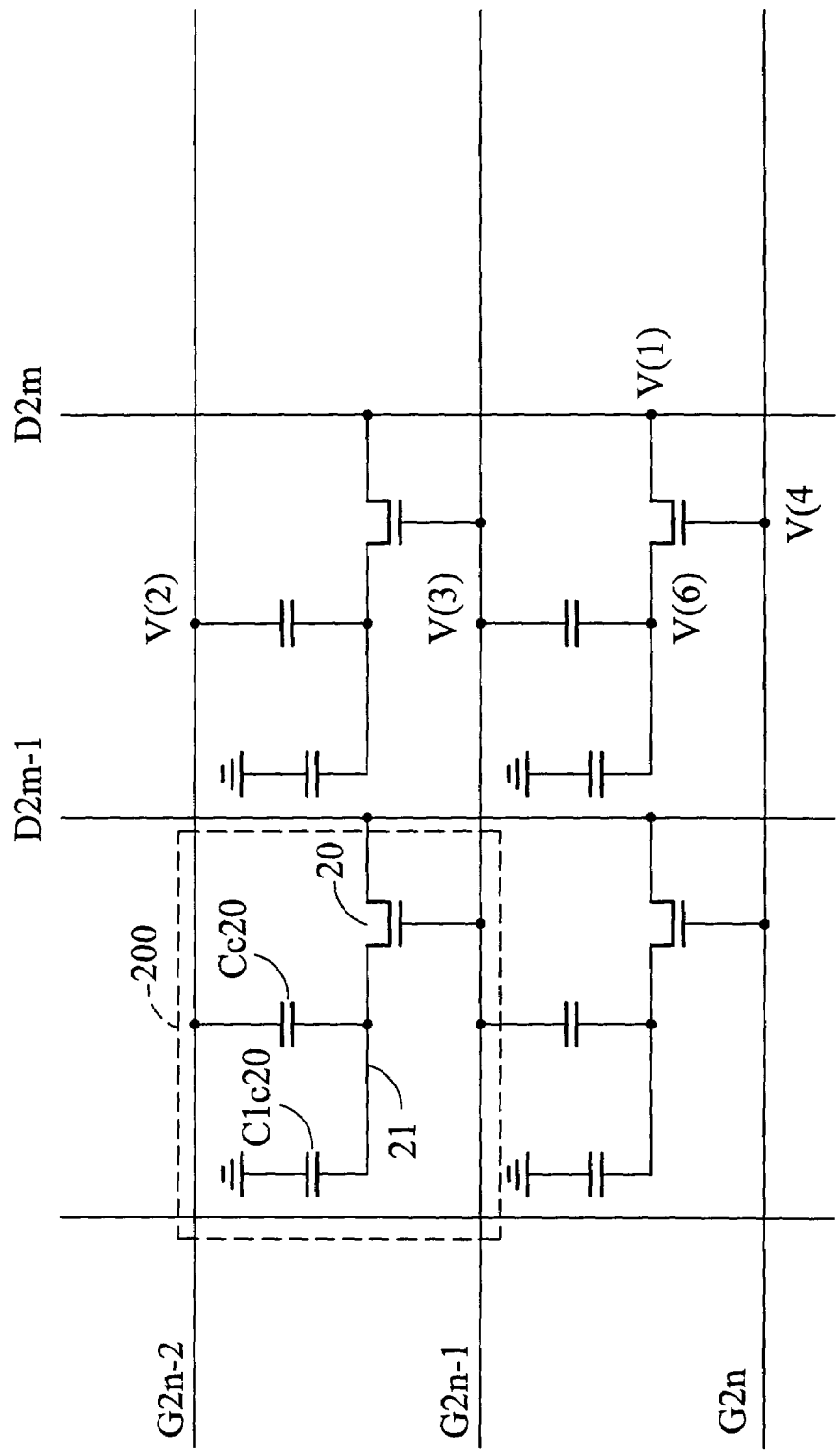
FIG. 2 is schematic diagram of a conventional Cs-on-gate array of a TFT-LCD.
Figure 3:
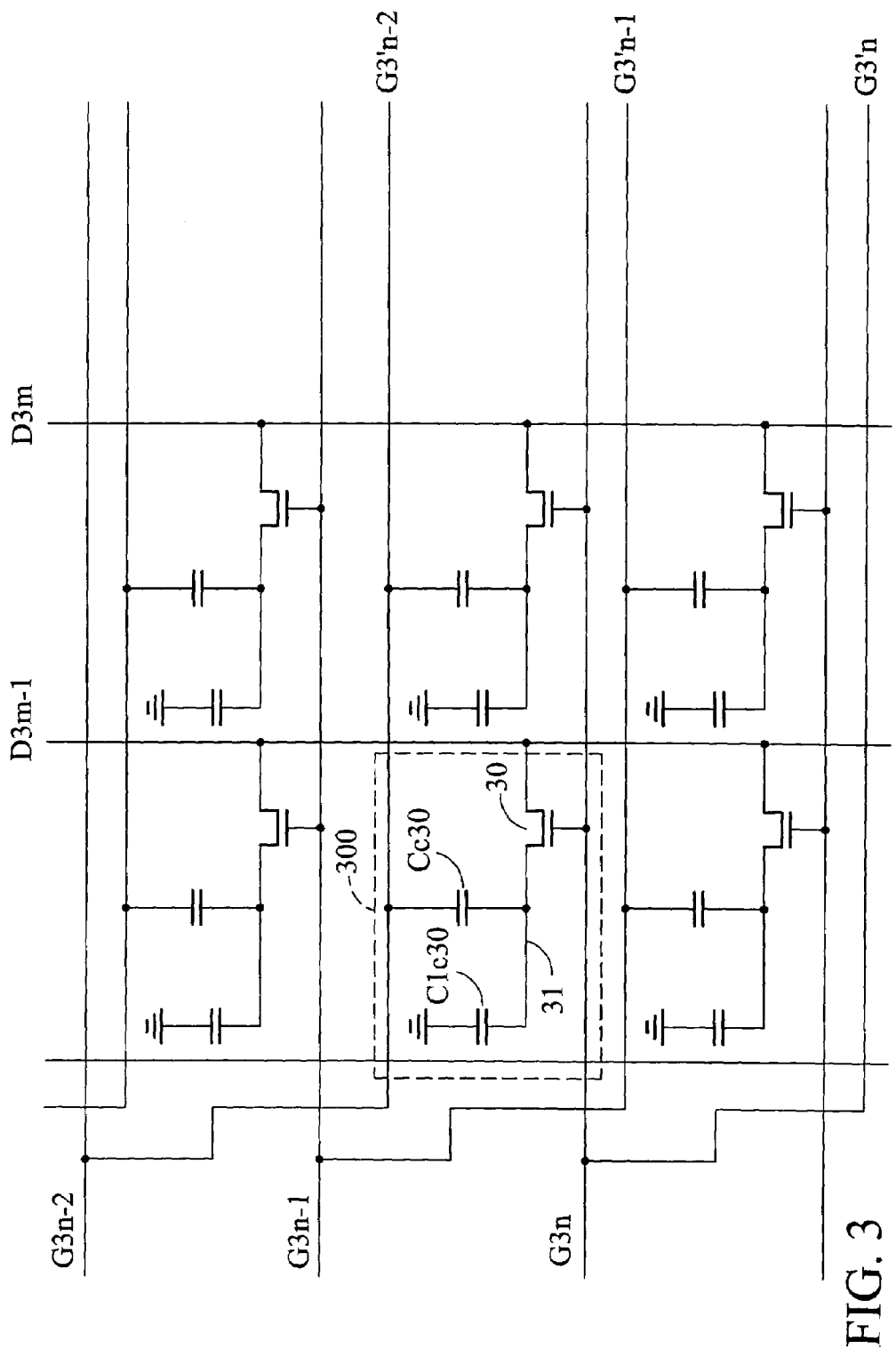
FIG. 3 is one array of a TFT-LCD of the present invention.

FIG. 3 is one array of a TFT-LCD of the present invention. The array 3 is formed by a plurality of gate lines $G3_n$ to $G3_{n-2}$ and a plurality of source lines $D3_m$ and $D3_{m-1}$, which are driven by a gate driver and a source driver (not shown). Sub gate lines $G'3_n$ to $G'3_{n-2}$ extend from the gate lines $G3_n$ to $G3_{n-2}$. The interlaced gate line and source line correspond to one cell comprising a TFT, a liquid capacitor, and a storage capacitor. Each gate line and the corresponding sub gate line carry the same signal.

As shown in FIG. 3, the gate line $G3_n$ and the source line $D3_{m-1}$ correspond to a cell 300. The cell 300 comprises a TFT 30, a crystal capacitor Clc30, and a storage capacitor Cs30. A gate of the TFT 30 is coupled to the gate line $G3_n$, a drain thereof is coupled to the source line $D3_{m-1}$. A source of the TFT 30, a first electrode of the crystal capacitor Clc30, and a first electrode of the storage capacitor Cs30 are coupled to a pixel electrode 31. A second electrode of the crystal capacitor Clc30 is coupled to a common electrode Vcom30. A second electrode of the storage capacitor Cs30 is coupled to the sub gate line $G'3_{n-2}$.

In the embodiment of the present invention, each gate line comprises one sub gate line. The first electrode of the storage capacitor within any cell is coupled to a pixel electrode thereof, and the second electrode thereof is coupled to the sub gate line of any gate line except the corresponding gate line. That is, each gate line is coupled to the gates of the TFTs within the cells on the corresponding row, and each sub gate line is coupled to the second electrodes of the storage capacitors within the cells on any row. Because the gate lines are not coupled to any storage capacitor, gate line delay time is decreased, and the TFTs are capable of providing increased charge.

Figure 4:
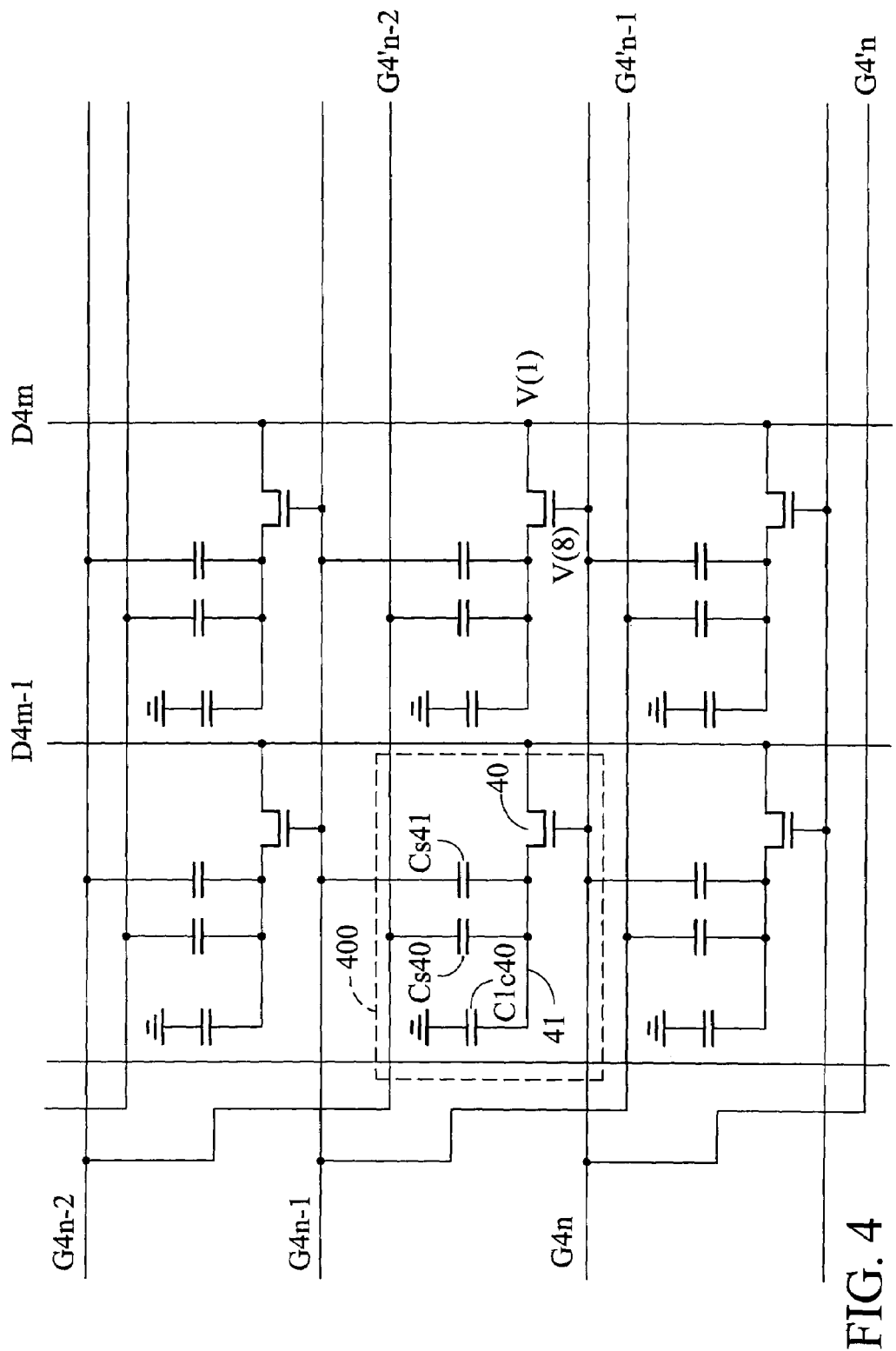
FIG. 4 is another array of the TFT-LCD of the present invention.

FIG. 4 is another array of the TFT-LCD of the present invention. The array 4 is formed by a plurality of gate lines $G4_n$ to $G4_{n-2}$ and a plurality of source lines $D4_m$ and $D4_{m-1}$, which are driven by a gate driver and a source driver (not shown). Sub gate lines $G'3_n$ to $G'3_{n-2}$ extend from the gate lines $G3_n$ to $G3_{n-2}$. The interlaced gate line and source line correspond to one cell comprising a TFT, a liquid capacitor, and a storage capacitor. Each gate line and the corresponding sub gate line carry the same signal.

As shown in FIG. 4, the gate line $G4_n$ and the source line $D4_{m-1}$ correspond to a cell 400. The cell 400 includes a TFT 40, a crystal capacitor Clc40, and storage capacitors Cs40 and Cs41. A gate of the TFT 40 is coupled to the gate line $G4_n$, a drain thereof is coupled to the source line $D4_{m-1}$. A source of the TFT 40, a first electrode of the crystal capacitor Clc40, and first electrodes of the storage capacitors Cs40 and Cs41 are coupled to a pixel electrode 41. A second electrode of the crystal capacitor Clc40 is coupled to a common electrode Vcom40. A second electrode of the storage capacitor Cs40 is coupled to the sub gate line $G'4_{n-2}$, and a second electrode of the storage capacitor Cs41 is coupled to the gate line $G4_{n-1}$.

According to the array 4, RC effect resulting from the gate lines and the storage capacitors degrades, thus reducing gate line delay time increasing ability of TFTs to charge the pixel electrodes. It is assumed that the TFTs within the array 2 are the same as the TFTs within the array 4, and the arrays 2 and 4 work at the same operating voltage. The values of the storage capacitors Cs40 and Cs41 are less than that of the storage capacitors Cs20. Although the second electrode of the storage capacitor Cs41 is coupled to the gate line $G4_{n-1}$, delay time of the gate line $G4_{n-1}$ decreases due to less capacitance induced by the RC effect.

Figure 5:
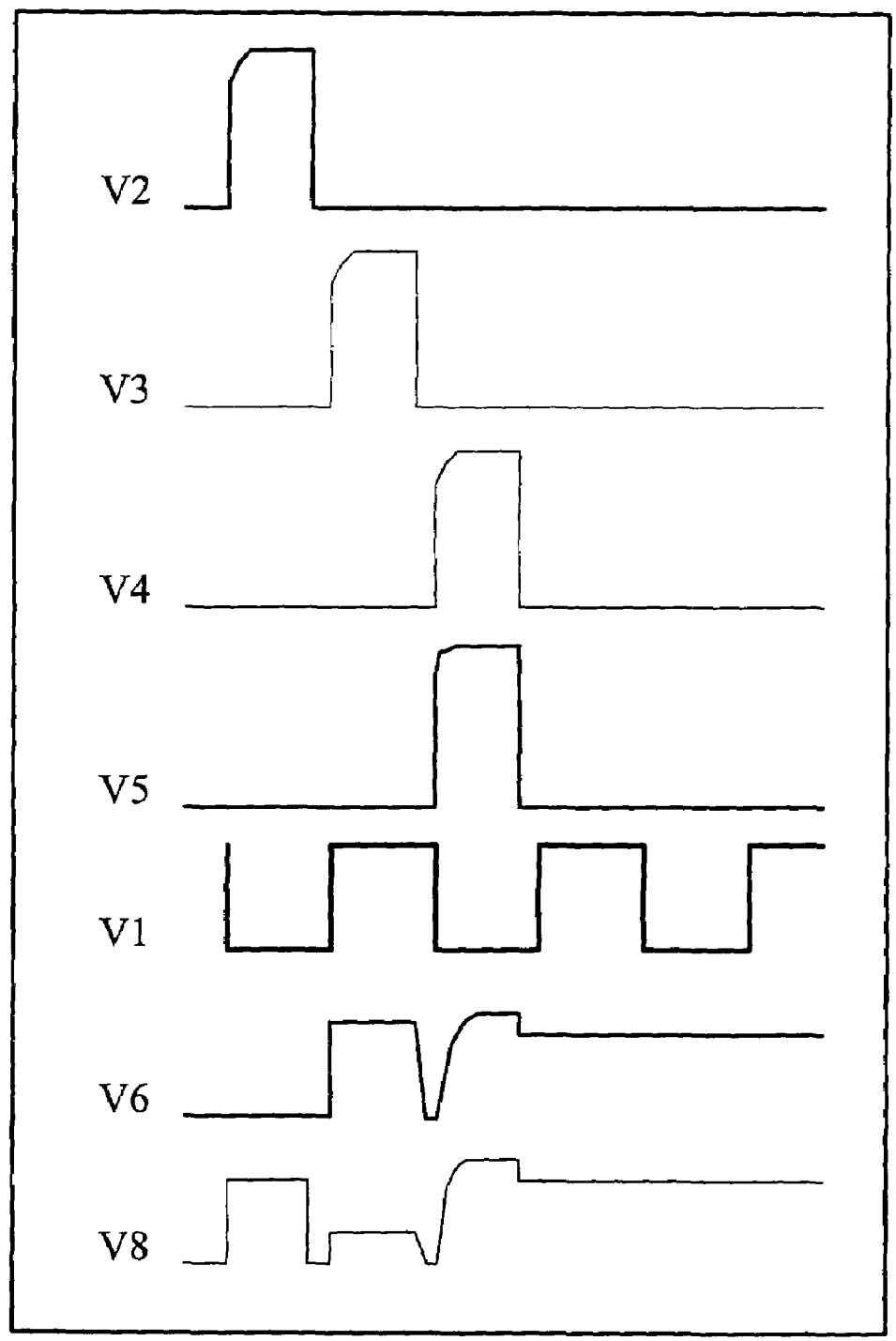
FIG. 5 is a operation timing chart of the arrays in FIGS. 2 and 4.

FIG. 5 is a operation timing chart of the arrays 2 and 4. It is assumed that all TFTs within the arrays 2 and 4 are the same, and total capacitance and resistance of the array 2 are equal to those of the array 4. A level of a signal V(5) on the gate line $G4_n$ rises faster than a level of a signal V(4) on the gate line $G2_n$. Thus a level of a voltage signal V(8) of the pixel electrode 41 rises faster than a level of a voltage signal V(6) of the pixel electrode 21. The ability of the TFTs to charge is improved.

In the embodiments of the present invention, any number of storage capacitors can be provided according to requirements, without limitation.

While several embodiments of the invention have been described by way of example, it is to be understood that the invention is not limited to the disclosed embodiments. To the contrary, it is intended that various modifications and similar arrangements (as would be apparent to those skilled in the art) be covered.

What is claimed is:

1. A liquid crystal display array, comprising:
   a plurality of gate lines, each comprising a first portion and a second portion extended from the first portion;
   a plurality of source lines; and
   a plurality of cells corresponding to the interlaced gate lines and source lines, each comprising a first storage capacitor and a second storage capacitor;
   wherein a first electrode of the first storage capacitor corresponding to a first gate line of the gate lines is coupled to the first portion or the second portion of one of gate lines expect the first gate line; and
   wherein a first electrode of the second storage capacitor corresponding to the first gate line is coupled to the first portion or the second portion of one of the gate lines expect the first gate line, and the first electrodes of the first and second storage capacitors are coupled to two different gate lines respectively.

2. The liquid crystal display array as claimed in claim 1, wherein each cell further comprises:
   a transistor comprising a control electrode coupled to the first portion of the corresponding gate line, a first electrode coupled to the corresponding source line, and a second electrode; and
   a liquid capacitor comprising a first electrode coupled to a common electrode, and a second electrode coupled to the second electrode of the transistor and a second electrode of the first storage capacitor.

3. The liquid crystal display array as claimed in claim 2, wherein the first electrode of the first storage capacitor corresponding to the first gate line is coupled to the second portion of any gate line expect the first gate line.

4. The liquid crystal display array as claimed in claim 1, wherein the first electrode of the first storage capacitor is coupled to a first portion of a second gate line adjacent to the first gate line.

5. The liquid crystal display array as claimed in claim 4, wherein the first electrode of the second storage capacitor is coupled to a second portion of a third gate line adjacent to the first gate line.

6. The liquid crystal display away as claimed in claim 1, wherein each cell further comprises:
   a transistor comprising a control electrode coupled to the first portion of the corresponding gate line, a first electrode coupled to the corresponding source line, and a second electrode; and
   a liquid capacitor having a first electrode coupled to a common electrode, and a second electrode coupled to the second electrode of the transistor and a second electrode of the first storage capacitor.

7. A liquid crystal display panel, comprising:
   a plurality of gate lines, each comprising a first portion and a second portion extended from the first portion;
   a plurality of source lines;
   a gate driver driving the gate lines;
   a source driver driving the source lines; and
   a plurality of cells corresponding to the interlaced gate lines and source lines, each comprising a first storage capacitor and a second storage capacitor;
   wherein a first electrode of the first storage capacitor corresponding to a first gate line of the gate lines is coupled to the first portion or the second portion of one of the gate lines expect the first gate line; and
   wherein a first electrode of the second storage capacitor corresponding to the first gate line is coupled to the first portion or the second portion of one of the gate lines expect the first gate line.

8. The liquid crystal display panel as claimed in claim 7, wherein each cell further comprises:
   a transistor comprising a control electrode coupled to the first portion of the corresponding gate line, a first electrode coupled to the corresponding source line, and a second electrode; and
   a liquid capacitor comprising a first electrode coupled to a common electrode, and a second electrode coupled to the second electrode of the transistor and a second electrode of the first storage capacitor.

9. The liquid crystal display panel as claimed in claim 8, wherein the first electrode of the first storage capacitor corresponding to the first gate line is coupled to the second portion of any gate line expect the first gate line.

10. The liquid crystal display panel as claimed in claim 8, wherein the first electrodes of the first and second storage capacitors are coupled to two different gate lines respectively.

11. The liquid crystal display panel as claimed in claim 8, wherein the first electrode of the first storage capacitor is coupled to a first portion of a second gate line adjacent to the first gate line.

12. The liquid crystal display panel as claimed in claim 11, wherein the first electrode of the second storage capacitor is coupled to a second portion of a third gate line adjacent to the first gate line.

13. The liquid crystal display panel as claimed in claim 8, wherein each cell further comprises:
 a transistor has a control electrode coupled to the first portion of the corresponding gate line, a first electrode coupled to the corresponding source line, and a second electrode; and
 a liquid capacitor having a first electrode coupled to a common electrode, and a second electrode coupled to the second electrode of the transistor and a second electrode of the first storage capacitor.

14. A liquid crystal display array, comprising:
 a first gate line;
 a second gate line adjacent to the first gate line;
 a plurality of third gate lines, wherein each of the first, second and third gate lines comprises a first portion and a second portion extended from the first portion;
 a plurality of source lines comprising a first source line; and
 a plurality of cells comprising a first cell coupled to the first gate and the first source line;
 wherein the first cell comprises a first storage capacitor; a first electrode of the first storage capacitor is coupled to the first portion or the second portion of one of the third gate lines.

15. The liquid crystal display away as claimed in claim 14, wherein the first cell further comprises:
 a transistor comprising a control electrode coupled to the first portion of the first gate line, a first electrode coupled to the first source line, and a second electrode; and
 a liquid capacitor comprising a first electrode coupled to a common electrode, and a second electrode coupled to the second electrode of the transistor and a second electrode of the first storage capacitor.

16. The liquid crystal display array as claimed in claim 15, wherein the first electrode of the first storage capacitor is coupled to the second portion of one of the third gate lines.

17. The liquid crystal display array as claimed in claim 14, wherein each cell further comprises a second storage capacitor, and a first electrode of the second storage capacitor is coupled to the second gate line.

18. The liquid crystal display array as claimed in claim 17, wherein the first, second, and the third gate line coupled to the first electrode of the first capacitor are arranged sequentially.

19. The liquid crystal display array as claimed in claim 14, wherein the first, second, and the third gate line coupled to the first electrode of the first capacitor are arranged sequentially.

* * * * *